Patented June 24, 1947

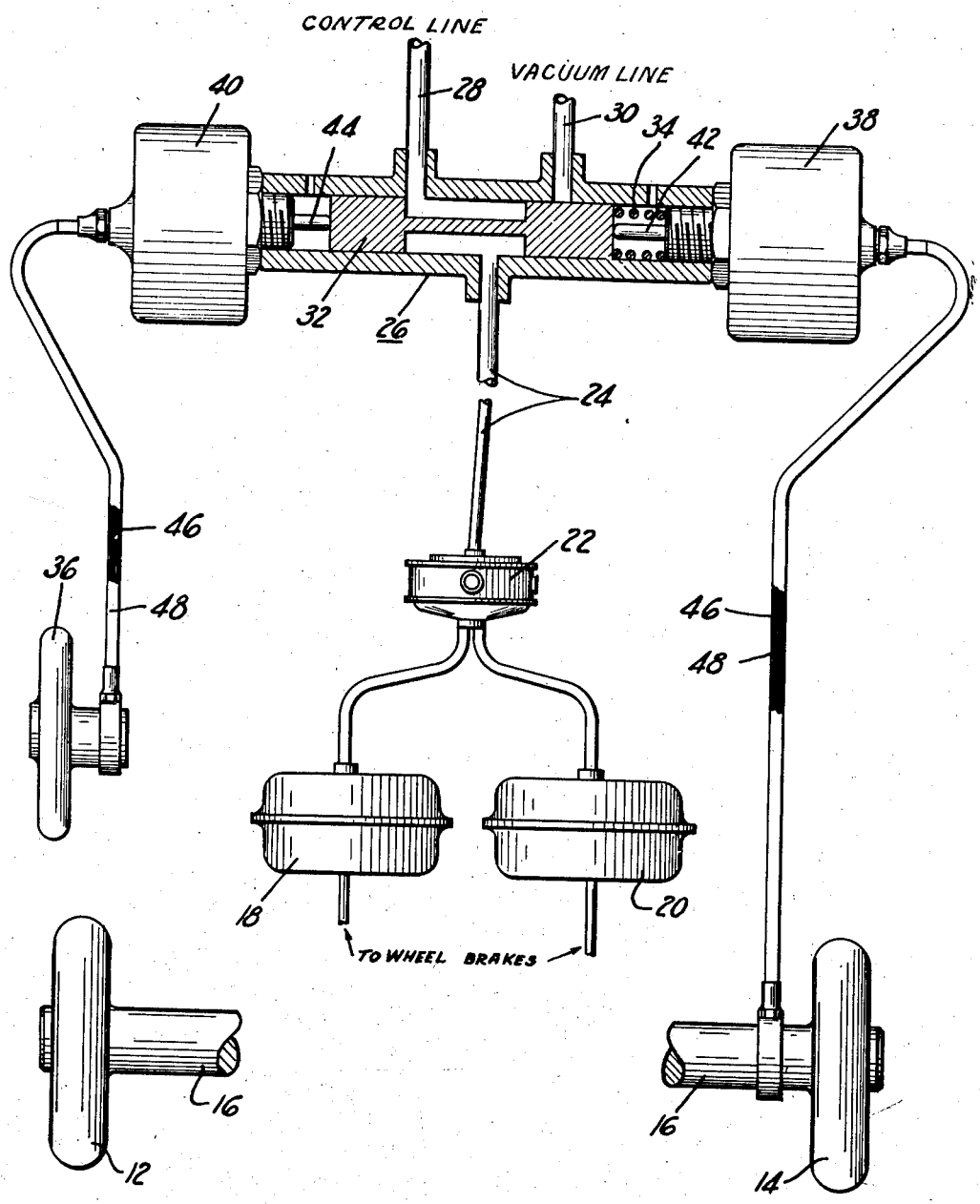

2,423,057

UNITED STATES PATENT OFFICE 2,423,057

AUTOMATIC BRAKE CONTROL

Thomas H. Thomas and Earl R. Price, South Bend, Ind., assignors to Bendix Aviation Corporation, South Bend, Ind., a corporation of Delaware Application May 29, 1944, Serial No. 537,862

3 Claims. (Cl. 188—181)

This invention relates to automatic brake controls.

An object of the invention is to provide automatically operating means for preventing excessive wheel slide when brake application is made on moving vehicles.

Other objects and advantages of the above invention will become apparent during the following description, reference being had therein to the accompanying drawing, wherein the single figure is a diagrammatic view of a braking system incorporating our invention, certain parts thereof being sectioned to clarify the illustration.

It is proposed to provide a brake control which is conjointly operated by means responsive to the speed of a braked member of the vehicle and by means responsive to the absolute speed of the vehicle. A tendency of the vehicle wheels to skid will cause the speed of the braked member to drop relative to the absolute speed of the vehicle, and we propose to utilize this change in relative speed to actuate a control which is capable of regulating the brake operating pressure, and which can therefore prevent excessive wheel slide.

The control device which prevents excessive brake pressure and thereby tends to avoid wheel slide may operate on any one of several basic principles. It may, for example, include a valve which will shut off the flow of hydraulic brake fluid from the master cylinder to wheel cylinders before excessive wheel slide occurs. It might incorporate a device which will resist or prevent depression of the brake pedal to a point which could cause wheel slide. Or, it may comprise a device which limits the effectiveness of an assistor type power brake unit.

In the device shown in the drawing, and for purposes of illustration only, we have shown the application of our invention to differential air pressure power means for applying brakes without manual assistance, such as might be used in a truck or trailer braking system. It should be clearly understood that the scope of the invention is in no way limited to this particular type of brake actuation.

Referring to the figure, a pair of wheels 12 and 14 mounted on an axle 16 are provided with the usual brake mechanism. Power means for actuating the brakes of the wheels 12 and 14 may be provided, such as the differential air pressure power cylinders 18 and 20, each of which is arranged to actuate one of the brakes. These power cylinders may be controlled by a relay or relay conversion valve 22, or connected directly to the control line. The valve 22 has no relation to the present invention.

A fluid pressure line or conduit 24 connects the valve 22 to an automatic control device 26. Leading from the automatic control device 26 is a fluid pressure line or conduit 28 which may be termed the "control line," since the pressure in this line is regulated by the vehicle operator in the customary manner.

The automatic control device 26 is also in communication, as by means of a conduit 30, with a pressure level which can reverse the direction of pressure change in the line 24 and thereby reduce the brake applying pressure whenever there is an excessive tendency for the wheels to slide or skid. Let us assume that the power braking system is of the vacuum type, and further that control line 28 is normally (in release) connected to a vacuum source, but is adapted to be connected to a higher pressure (such as atmospheric pressure) in order to cause application of the brakes. Then the line 30 would be permanently connected to a vacuum source in order that the brake applying pressure in cylinders 18 and 20 would be reduced whenever conduit 24 was in communication with line 30.

The construction of the automatic control device 26 is not shown in a particularly refined form, since the present invention is not particularly concerned with details of valve construction, but only with the general operating characteristics of the valve. A valve member 32 is provided for the purpose of controlling communication between the conduit 24 on the one hand and the conduits 28 and 30 on the other hand. The position of the valve member 32 is normally such that conduit 24 is in communication with conduit 28. This means that operation of the power cylinders 18 and 20 will be under the direct control of the operator. The valve member 32 remains in this position at all times, except when the vehicle wheels 12 and 14 are sliding or a tendency toward sliding of the wheels is indicated. In other words, the valve member 32 remains in the position shown while the brakes are released and also during all normal brake applications.

Means should be provided to bias the valve member 32 to the position shown in the drawing, wherein lines 24 and 28 are in communication with one another. A compression spring 34 acting against the right end of valve member 32 may be used for this purpose. Obviously, the strength of this spring will determine the force which must be exerted to move the plunger 32 to the right to cut off conduit 28 and subsequently connect conduit 30 with conduit 24.

In addition to the spring 34, the valve member 32 is acted upon by two forces, one tending to move it toward the left, or in other words, to retain it in the normally open position, and the other tending to move it toward the right. It is intended that the force tending to hold the valve in the normally open position be proportional to the speed of a braked member of the vehicle, such as the wheel 14, whereas the force tending to move the valve member 32 to the right is proportional to the absolute speed of the vehicle, which may be indicated, for example, by a free-running or unbraked wheel 36.

For the purpose of developing the opposing forces which control operation of the valve member 32, a pair of simple flyball governors 38 and 40 may be used. Each of these governors may have one or more weights rotating therein at a speed proportional to the rotating speed of the respective wheel. If the speed of rotation of either wheel varies, the centrifugal force of the weight or weights in the associated governor changes. By translating this centrifugal force into an axial force acting through the respective rod 42 or 44, control of the valve member 32 is obtained. It is not deemed necessary to explain the operation of the governors 38 and 40 in great detail, since the operation is based on conventional principles. The centrifugal force of the rotating weights acts through a bell crank arrangement to push through the respective rod 42 or 44 against the adjacent end of the valve member 32.

To control the speed of rotation of the governor weights of each governor, the weights are connected by means of the usual adapter to a rotating cable 46, which is located inside a non-rotating casing or conduit 48. The principle of operation of the rotating cables is preferably similar to that used in various speedometer and governor controls. The end of each cable 46 farthest from the respective governor is secured to a gear which is driven by another gear rotating with the respective wheel 14 or 36. The rate of rotation of each cable 46 is therefore proportional to the rate of rotation of the respective wheel, with the result that the centrifugal force developed by the respective governor will also be proportional to the rate of rotation of the associated wheel.

In operation, if the braked wheel 14 tends to slide, the speed of the governor mechanism 38 will be reduced. On the other hand speed of the left hand governor 40 will not be correspondingly reduced because the free-running wheel 36 does not tend to slide. Therefore the force exerted by governor 40 through rod 44 will overcome the force exerted by governor 38 through rod 42 (of course, the strength of spring 34 must be taken into account). As a result rod 44 will move valve member 32 to the right to close off conduit 28 and prevent further increase of pressure (toward full atmospheric pressure) in the brake applying cylinders 18 and 20. Additional movement of the valve member 32 toward the right connects conduit 24 to conduit 30, which reverses the direction of pressure change in conduit 24 and therefore tends to reduce the brake applying pressure in power cylinders 18 and 20. The tendency to release the brakes continues until a compromise pressure is obtained, at which point maximum deceleration of the braked wheels 12 and 14 will be attained without permitting them to slide excessively. When the wheel 14 ceases to slide and the speed of the governor 38 increases sufficiently, the valve member 32 will be forced back to the left to cut off conduit 30.

Although a particular embodiment of our invention has been described, it will be understood by those skilled in the art that the object of the invention may be attained by the use of constructions different in certain respects from that disclosed without departing from the underlying principles of the invention. We therefore desire by the following claims to include within the scope of our invention all such variations and modifications by which substantially the results of our invention may be obtained through the use of substantially the same or equivalent means.

We claim:

1. For use in a vehicle having a fluid pressure braking system including brake applying means, an operator operated control for the same, and a conduit interconnecting the operator operated control and the brake applying means, means for automatically restricting the brake application to overcome wheel sliding comprising valve means interposed in the conduit for regulating brake applying pressure, said valve means being normally positioned so as not to interfere with control of the brake applying means by the operator, but being movable to a position in which it causes reduction of the brake applying pressure regardless of the operator's actions, resilient means normally retaining the valve means in non-interfering position, a centrifugal governor rotating at a speed proportional to that of a braked wheel and tending to hold the valve in non-interfering position with the force developed, and a second centrifugal governor rotating at a speed proportional to that of a free-running wheel and tending to move the valve into brake pressure reducing position, the brake applying pressure being reduced whenever a predetermined differential develops between the speeds of the free-running and braked wheels.

2. In a fluid pressure braking system having a fluid pressure control line for effecting operation of the brakes, a valve body having a first port connected to said fluid line, a second port connected to the brakes, and a third port connected to a brake-releasing-pressure-source, a valve element associated with said valve body and movable from a first position in which it causes the first and second ports to be interconnected while the third port is closed to a second position in which it causes the second and third ports to be interconnected while the first port is closed, means for biasing said valve element to said first position, means for exerting a force proportional to the speed of a braked member of the vehicle tending to hold the valve element in said first position, and means for exerting a force proportional to the absolute speed of the vehicle tending to move the valve element to said second position.

3. In a vehicle having a braked wheel, a free-running wheel, and a fluid pressure braking system including a fluid pressure control line for effecting operation of the brakes, a valve body having a first port connected to said fluid line, a second port connected to the brakes, and a third port connected to a brake-releasing-pressure-source, a valve element associated with said valve body and movable from a first position in which it causes the first and second ports to be interconnected while the third port is closed to a second position in which it causes the second and third ports to be interconnected while the first port is closed, means for biasing said valve element to said first position, means responsive to the speed of the braked wheel for exerting a force proportional to the speed of said wheel tending to hold the valve element in said first position, and means responsive to the speed of the free-running wheel for exerting a force proportional to the absolute speed of the vehicle tending to move the valve element to said second position.

T. H. THOMAS.
EARL R. PRICE.

REFERENCES CITED

The following references are of record in the file of this patent:

UNITED STATES PATENTS

| Number | Name | Date |
|---|---|---|
| 2,038,145 | Cook et al. | Apr. 21, 1936 |
| 2,140,620 | Farmer | Dec. 20, 1938 |

FOREIGN PATENTS

| Number | Country | Date |
|---|---|---|
| 802,357 | France | June 6, 1936 |
| 7,589 | Great Britain | 1908 |